US010066847B2

(12) United States Patent
Zhang et al.

(10) Patent No.: US 10,066,847 B2
(45) Date of Patent: Sep. 4, 2018

(54) METHOD AND DEVICE FOR CONTROLLING OPERATION OF SENSOR IN AIR PURIFIER

(71) Applicant: DONGGUAN LIFA AIR TECHNOLOGY LIMITED, Guangdong (CN)

(72) Inventors: Wendong Zhang, Guangdong (CN); Yu Wen, Guangdong (CN)

(73) Assignee: Dongguan Lifa Air Technology Limited (CN)

( * ) Notice: Subject to any disclaimer, the term of this patent is extended or adjusted under 35 U.S.C. 154(b) by 57 days.

(21) Appl. No.: 15/327,788

(22) PCT Filed: Jul. 27, 2016

(86) PCT No.: PCT/CN2016/091903
§ 371 (c)(1),
(2) Date: Jan. 20, 2017

(87) PCT Pub. No.: WO2017/121091
PCT Pub. Date: Jul. 20, 2017

(65) Prior Publication Data
US 2018/0209671 A1   Jul. 26, 2018

(30) Foreign Application Priority Data
Jan. 13, 2016  (CN) .......................... 2016 1 0024959

(51) Int. Cl.
*F24F 11/30*   (2018.01)
*F24F 3/16*   (2006.01)
(Continued)

(52) U.S. Cl.
CPC ............ *F24F 11/30* (2018.01); *F24F 3/1607* (2013.01); *F24F 11/52* (2018.01); *F24F 2110/50* (2018.01)

(58) Field of Classification Search
CPC .......... F24F 3/1607; F24F 11/30; F24F 11/52; F24F 2110/50; F24F 2110/64
See application file for complete search history.

(56) References Cited

U.S. PATENT DOCUMENTS

2004/0222307 A1   11/2004 DeLuca
2005/0144963 A1   7/2005 Peterson et al.
(Continued)

FOREIGN PATENT DOCUMENTS

CN   101539460 A   9/2009
CN   203642372 U   6/2014
(Continued)

OTHER PUBLICATIONS

European Patent Application No. 16825693.1: Extended European Search Report dated Dec. 4, 2017, 5 pages.
(Continued)

*Primary Examiner* — Robert Clemente
(74) *Attorney, Agent, or Firm* — Baker & Hostetler LLP

(57) ABSTRACT

A method and device for controlling operation of sensor in air purifier are provided, to solve technical problem that operating life of sensor is shortened when air quality is detected by sensor in real-time manner since sensor needs to operate whether air quality changes or not. The method for controlling operation of sensor in air purifier includes: obtaining current time period; determining operating mode of sensor based on current time period, and controlling, if time period is daytime period, the sensor to operate continuously for first preset operating period and stop operating for first preset power-down period to perform a periodic control for first preset number of cycles per hour; and controlling, if the time period is nighttime period, the sensor to operate continuously for second preset operating period and stopping operating for second preset power-down period (Continued)

to perform periodic control for second preset number of cycles per hour.

16 Claims, 4 Drawing Sheets

(51) Int. Cl.
*F24F 11/52* (2018.01)
*F24F 110/50* (2018.01)

(56) References Cited

U.S. PATENT DOCUMENTS

| | | |
|---|---|---|
| 2006/0154596 A1 | 7/2006 | Meneely, Jr. et al. |
| 2009/0230307 A1 | 9/2009 | Han et al. |

FOREIGN PATENT DOCUMENTS

| | | |
|---|---|---|
| CN | 104502525 A | 4/2015 |
| CN | 104613594 A | 5/2015 |
| CN | 104750154 A | 7/2015 |
| CN | 104776548 A | 7/2015 |
| CN | 104930660 A | 9/2015 |
| CN | 105020857 A | 11/2015 |
| CN | 105180370 A | 12/2015 |
| CN | 105465971 A | 4/2016 |
| CN | 105465972 A | 4/2016 |
| JP | H11-182914 | 7/1999 |

OTHER PUBLICATIONS

Chinese Patent Application No. 201610024959.8: 1st Office Action dated Dec. 25, 2017, with summary, 8 pages.

US 10,066,847 B2

METHOD AND DEVICE FOR CONTROLLING OPERATION OF SENSOR IN AIR PURIFIER

CROSS-REFERENCE TO RELATED APPLICATIONS

The application is the national phase of International Application No. PCT/CN2016/091903, titled "METHOD AND DEVICE FOR CONTROLLING OPERATION OF SENSOR IN AIR PURIFIER", and filed on Jul. 27, 2016, which claims the priority to Chinese Patent Application No. 201610024959.8, titled "METHOD AND DEVICE FOR CONTROLLING OPERATION OF SENSOR IN AIR PURIFIER", filed on Jan. 13, 2016 with the State Intellectual Property Office of the People's Republic of China, which are incorporated herein by reference in their entireties.

TECHNICAL FIELD

The present disclosure relates to the technical field of air purification, and in particular to a method and a device for controlling operation of a sensor in an air purifier.

BACKGROUND

Air purifiers are also known as "air cleaners", air filters or purifiers, which are products that can adsorb, decompose or transform various air pollutants (generally including PM2.5, dust, pollen, odor, bacteria, allergens and decoration pollution such as formaldehyde), to effectively improve air cleanliness. The air purifiers are mainly for household, commercial, industrial or building use.

There are multiple different technologies and mediums for the air purifiers, which enable the air purifiers to provide clean and safe air for users. Commonly used air purification technologies include: adsorption technology, negative (positive) ion technology, catalytic technology, photocatalyst technology, superstructure light mineralization technology, HEPA high efficiency filtration technology and electrostatic dust collection technology. Material technologies mainly include: photocatalyst, activated carton, synthetic fiber, HEAP high efficient materials and negative ion generator. Conventional air purifiers are usually of combined type. That is, a conventional air purifier may adopt multiple purification technologies and material media.

When using a conventional air purifier, in order for a user to know a condition of air quality at any time, detection is performed via a sensor in a real-time manner.

In practice, in the above case that the air quality is detected via the sensor in a real-time manner, the sensor needs to be in operation whether the air quality changes or not, resulting in a technical problem that operating life of the sensor is shortened.

SUMMARY

A method and a device for controlling operation of a sensor in an air purifier are provided according to the present disclosure, to solve the technical problem that operating life time of a sensor is shortened when air quality is detected by the sensor in a real-time manner at present due to the fact that the sensor is required to be in an operating state whether the air quality changes or not.

A method for controlling operation of a sensor in an air purifier is provided according to the present disclosure, which includes:

obtaining a current time period;

determining an operating mode of the sensor based on the current time period, and controlling, in a case that the current time period is a daytime period, the sensor to operate continuously for a first preset operating time period and stop operating for a first preset power-down time period to perform a periodic control for a first preset number of cycles per hour; and controlling, in a case that the current time period is a nighttime period, the sensor to operate continuously for a second preset operating time period and stop operating for a second preset power-down time period to perform a periodic control for a second preset number of cycles per hour.

Optionally, the obtaining a current time period specifically includes: obtaining the current time period indicated by an internal RTC clock.

Optionally, in a case that the current time period is a daytime period, the sensor is controlled to operate continuously for a time period of 1 minute to 2 minutes and stop operating for a time period of 4 minutes to 6 minutes to perform a periodic control for 10 cycles per hour.

Optionally, the controlling, in a case that the current time period is a nighttime period, the sensor to operate continuously for a second preset operating time period and stop operating for a second preset power-down time period to perform a periodic control for a second preset number of cycles per hour specifically includes:

controlling, in a case that the current time period is a nighttime period, the sensor to operate continuously for a time period of 1 minute to 2 minutes and stop operating for a time period of 10 minutes to 12 minutes to perform a periodic control for 5 cycles per hour.

Optionally, after the controlling, in a case that the current time period is a daytime period, the sensor to operate continuously for a time period of 1 minute to 2 minutes and stop operating for a time period of 4 minutes to 6 minutes to perform a periodic control for 10 cycles per hour, the method further includes:

determining, when the sensor has operated continuously for a third preset number of cycles, whether air quality detected by the sensor is less than a preset threshold, and controlling, in a case the air quality detected by the sensor is less than the preset threshold, the sensor to operate continuously for a time period of 1 minute to 2 minutes and stop operating for a time period of 10 minutes to 12 minutes to perform a periodic control for 5 cycles per hour.

Optionally, after the controlling, in a case that the current time period is a nighttime period, the sensor to operate continuously for a time period of 1 minute to 2 minutes and stop operating for a time period of 10 minutes to 12 minutes to perform a periodic control for 5 cycles per hour, the method further includes:

determining, when the sensor has operated continuously for a third preset number of cycles, whether air quality detected by the sensor is less than a preset threshold, and controlling, in a case the air quality detected by the sensor is less than the preset threshold, the sensor to operate continuously for a time period of 1 minute to 2 minutes and stop operating for a time period of 18 minutes to 20 minutes to perform a periodic control for 3 cycles per hour.

Optionally, after the determining, when the sensor has operated continuously for a third preset number of cycles, whether air quality detected by the sensor is less than a preset threshold, and controlling, in a case that the air quality detected by the sensor is less than the preset threshold, the sensor to operate continuously for a time period of 1 minute to 2 minutes and stop operating for a time period of 10 minutes to 12 minutes to perform a periodic control for 5 cycles per hour, or, the determining, when the sensor has operated continuously for a third preset number of cycles, whether air quality detected by the sensor is less than a preset threshold, and controlling, in a case the air quality detected by the sensor is less than the preset threshold, the sensor to operate continuously for a time period of 1 minute to 2 minutes and stop operating for a time period of 18 minutes to 20 minutes to perform a periodic control for 3 cycles per hour, the method further includes:

determining whether air quality detected by the sensor is greater than a preset threshold, and performing, in a case the air quality detected by the sensor is greater than the preset threshold, a return-to-zero processing on a time period corresponding to a power down operation, for the sensor to be restored to the operating mode of the daytime period or the nighttime period.

A device for controlling operation of a sensor in an air purifier is provided according to the present disclosure, and the device includes:

an obtaining unit, configured to obtain a current time period;

an operating mode determining unit, configured to determine an operating mode of the sensor based on the current time period, trigger a daytime operating unit in a case that the current time period is a daytime period, and trigger a nighttime operating unit in a case that the current time period is a nighttime period;

the daytime operating unit, configured to control the sensor to operate continuously for a first preset operating time period and stop operating for a first preset power-down time period to perform a periodic control for a first preset number of cycles per hour; and the nighttime operating unit, configured to control the sensor to operate continuously for a second preset operating time period and stop operating for a second preset power-down time period to perform a periodic control for a second preset number of cycles per hour.

Optionally, the obtaining unit is specifically configured to obtain the current time period indicated by an internal RTC clock.

Optionally, the daytime operating unit specifically includes: a first daytime operating subunit, configured to control, in a case that the current time period is a daytime period, the sensor to operate continuously for a time period of 1 minute to 2 minutes and stop operating for a time period of 4 minutes to 6 minutes to perform a periodic control for 10 cycles per hour.

Optionally, the nighttime operating unit specifically includes: a first nighttime operating subunit, configured to control, in a case that the current time period is a nighttime period, the sensor to operate continuously for a time period of 1 minute to 2 minutes and stop operating for a time period of 10 minutes to 12 minutes to perform a periodic control for 5 cycles per hour.

Optionally, the daytime operating unit further includes: a second daytime operating subunit, configured to determine, when the sensor has operated continuously for a third preset number of cycles, whether air quality detected by the sensor is less than a preset threshold, and control, in a case the air quality detected by the sensor is less than the preset threshold, the sensor to operate continuously for a time period of 1 minute to 2 minutes and stop operating for a time period of 10 minutes to 12 minutes to perform a periodic control for 5 cycles per hour.

Optionally, the nighttime operating unit further includes: a second nighttime operating subunit, configured to determine, when the sensor has operated continuously for a third preset number of cycles, whether air quality detected by the sensor is less than a preset threshold, and control, in a case the air quality detected by the sensor is less than the preset threshold, the sensor to operate continuously for a time period of 1 minute to 2 minutes and stop operating for a time period of 18 minutes to 20 minutes to perform a periodic control for 3 cycles per hour.

Optionally, the device for controlling the operation of the sensor in the air purifier further includes: a determining unit, configured to determine whether air quality detected by the sensor is greater than a preset threshold, and perform, in a case the air quality detected by the sensor is greater than the preset threshold, a return-to-zero processing on a time period corresponding to a power down operation, for the sensor to be restored to the operating mode of the daytime period or the nighttime period.

It can be seen from the above technical solutions that, the present disclosure has the following advantages.

The method and the device for controlling the operation of the sensor in the air purifier are provided according to the present disclosure. The method for controlling the operation of the sensor in the air purifier includes: obtaining the current time period; determining the operating mode based on the current time period, and controlling, in a case that the current time period is a daytime period, the sensor to operate continuously for the first preset operating time period and stop operating for the first preset power-down time period to perform a periodic control for the first preset number of cycles per hour; and controlling, in a case that the current time period is a nighttime period, the sensor to operate continuously for the second preset operating time period and stop operating for the second preset power-down time period to perform a periodic control for the second preset number of cycles per hour. In the present disclosure, the current time period is obtained, and the operating mode of the sensor is determined based on the current time period. In a case that the current time period is a daytime period, the sensor is controlled to operate continuously for the first preset operating time period and stop operating for the first preset power-down time period to perform a periodic control for the first preset number of cycles per hour. In a case that the current time period is a nighttime period, the sensor is controlled to operate continuously for the second preset operating time period and stop operating for the second preset power-down time period to perform a periodic control for the second preset number of cycles per hour. Based on the present disclosure, the technical problem that operating life time of a sensor is shortened when air quality is detected by the sensor in a real-time manner at present due to the fact that the sensor is required to be in an operating state whether the air quality changes or not is solved.

BRIEF DESCRIPTION OF THE DRAWINGS

In order to illustrate technical solutions in embodiments of the present disclosure or in the conventional technology more clearly, drawings used in the description of the embodiments or the conventional technology are introduced briefly hereinafter. Apparently, the drawings described hereinafter merely illustrate some embodiments of the present

DETAILED DESCRIPTION OF THE EMBODIMENTS

A method and a device for controlling operation of a sensor in an air purifier are provided according to embodiments of the present disclosure, to solve the technical problem that operating life time of a sensor is shortened when air quality is detected by the sensor in a real-time manner at present due to the fact that the sensor is required to be in an operating state whether the air quality changes or not.

For a better understanding of the object, technical solutions and advantages of the present disclosure, the technical solutions in the embodiments of the present disclosure are clearly and completely described hereinafter in conjunction with the drawings in the embodiments of the present disclosure. Apparently, the described embodiments are only a few rather that all of the embodiments of the invention. All other embodiments obtained by those skilled in the art based on the embodiments of the present disclosure without any creative efforts fall within the protection scope of the present disclosure.

Figure 1:
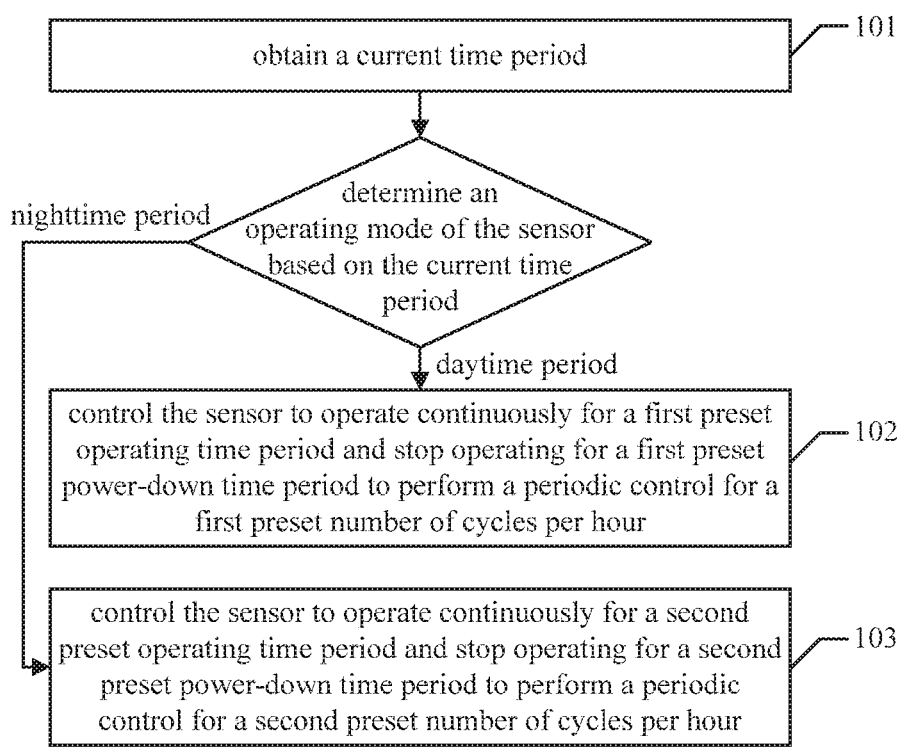
FIG. 1 is a schematic flow chart of a method for controlling operation of a sensor in an air purifier according to an embodiment of the present disclosure.

Referring to FIG. 1, a method for controlling operation of a sensor in an air purifier according to an embodiment of the present disclosure includes the following steps 101 to 103.

In step 101, a current time period is obtained.

In the embodiment, in order to make the sensor in the air purifier operate in an intermittent mode, the current time period needs to be obtained.

In step 102, an operating mode of the sensor is determined based on the current time period. In a case that the current time period is a daytime period, the sensor is controlled to operate continuously for a first preset operating time period and stop operating for a first preset power-down time period to perform a periodic control for a first preset number of cycles per hour.

After the current time period is obtained, the operating mode of the sensor needs to be determined based on the current time period. In a case that the current time period is a daytime period, the sensor is controlled to operate continuously for the first preset operating time period and stop operating for the first preset power-down time period to perform a periodic control for the first preset number of cycles per hour.

In step 103, in a case that the current time period is a nighttime period, the sensor is controlled to operate continuously for a second preset operating time period and stop operating for a second preset power-down time period to perform a periodic control for a second preset number of cycles per hour.

The operating mode of the sensor is determined based on the current time period. In a case that the current time period is a nighttime period, the sensor is controlled to operate continuously for the second preset operating time period and stop operating for the second preset power-down time period to perform a periodic control for the second preset number of cycles per hour.

In the embodiment, the current time period is obtained, and the operating mode of the sensor is determined based on the current time period. In a case that the current time period is a daytime period, the sensor is controlled to operate continuously for the first preset operating time period and stop operating for the first preset power-down time period to perform a periodic control for the first preset number of cycles per hour. In a case that the current time period is a nighttime period, the sensor is controlled to operate continuously for the second preset operating time period and stop operating for the second preset power-down time period to perform a periodic control for the second preset number of cycles per hour. Based on the present disclosure, the technical problem that operating life time of a sensor is shortened when air quality is detected by the sensor in a real-time manner at present due to the fact that the sensor is required to be in an operating state whether the air quality changes or not is solved.

Figure 2:
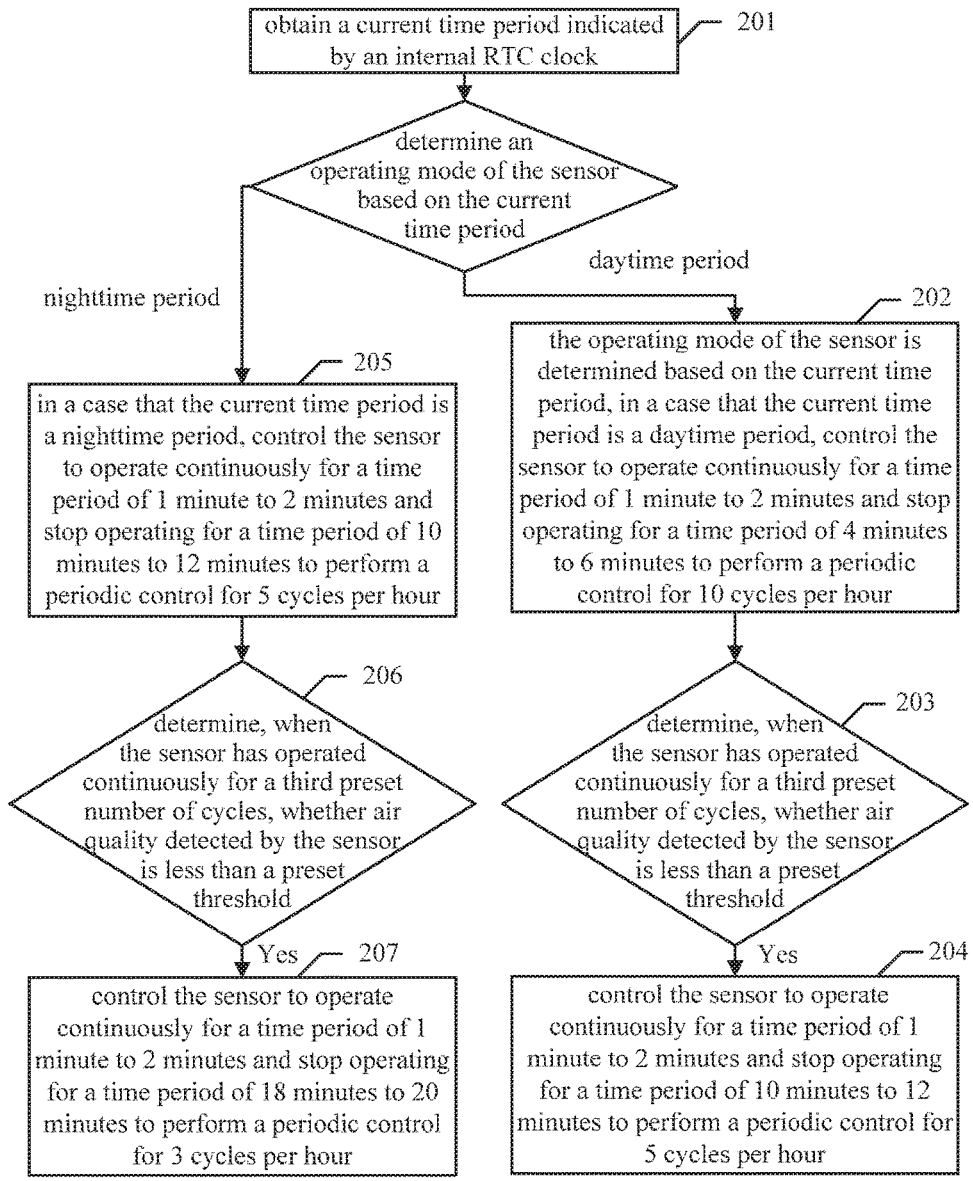
FIG. 2 is a schematic flow chart of a method for controlling operation of a sensor in an air purifier according to another embodiment of the present disclosure.

A process of the method for controlling the operation of the sensor in the air purifier is described above in detail, and hereinafter, a specific process is described in detail. Referring to FIG. 2, a method for controlling operation of a sensor in an air purifier according to another embodiment of the present disclosure includes the following steps 201 to 207.

In step 201, a current time period indicated by an internal RTC clock is obtained.

In the embodiment, in order to make the sensor in the air purifier operate in an intermittent mode, the current time period indicated by the internal RTC clock needs to be obtained.

In step 202, an operating mode of the sensor is determined based on the current time period. In a case that the current time period is a daytime period, the sensor is controlled to operate continuously for a time period of 1 minute to 2 minutes and stop operating for a time period of 4 minutes to 6 minutes to perform a periodic control for 10 cycles per hour.

After the current time period indicated by the internal RTC clock is obtained, the operating mode of the sensor needs to be determined based on the current time period. In a case that the current time period is a daytime period, the sensor is controlled to operate continuously for a time period of 1 minute to 2 minutes and stop operating for a time period of 4 minutes to 6 minutes to perform a periodic control for 10 cycles per hour.

In step 203, it is determined, when the sensor has operated continuously for a third preset number of cycles, whether air quality detected by the sensor is less than a preset threshold. If the air quality is less than the preset threshold, the process proceeds to step 204.

In a case that the current time period is a daytime period, the sensor is controlled to operate continuously for a time period of 1 minute to 2 minutes and stop operating for a time period of 4 minutes to 6 minutes to perform a periodic control for 10 cycles per hour. Then, it needs to be determined, when the sensor has operated continuously for the third preset number of cycles, whether the air quality detected by the sensor is less than the preset threshold. If the air quality is less than the preset threshold, the process proceeds to step 204.

In step 204, the sensor is controlled to operate continuously for a time period of 1 minute to 2 minutes and stop operating for a time period of 10 minutes to 12 minutes to perform a periodic control for 5 cycles per hour is performed.

If it is determined, when the sensor has operated continuously for the third preset number of cycles, that the air quality detected by the sensor is less than the preset threshold, the sensor is controlled to operate continuously for a time period of 1 minute to 2 minutes and stop operating for a time period of 10 minutes to 12 minutes to perform a periodic control for 5 cycles per hour.

In step 205, in a case that the current time period is a nighttime period, the sensor is controlled to operate continuously for a time period of 1 minute to 2 minutes and stop operating for a time period of 10 minutes to 12 minutes to perform a periodic control for 5 cycles per hour.

The operating mode of the sensor is determined based on the current time period. In a case that the current time period is a nighttime period, the sensor is controlled to operate continuously for a time period of 1 minute to 2 minutes and stop operating for a time period of 10 minutes to 12 minutes to perform a periodic control for 5 cycles per hour.

In step 206, it is determined, when the sensor has operated continuously for a third preset number of cycles, whether air quality detected by the sensor is less than a preset threshold. If the air quality is less than the preset threshold, the process proceeds to step 207.

In a case that the current time period is a nighttime period, the sensor is controlled to operate continuously for a time period of 1 minute to 2 minutes and stop operating for a time period of 10 minutes to 12 minutes to perform a periodic control for 5 cycles per hour. Then, it needs to be determined, when the sensor has operated continuously for the third preset number of cycles, whether the air quality detected by the sensor is less than the preset threshold. If the air quality is less than the preset threshold, the process proceeds to step 207.

In step 207, the sensor is controlled to operate continuously for a time period of 1 minute to 2 minutes and stop operating for a time period of 18 minutes to 20 minutes to perform a periodic control for 3 cycles per hour.

If it is determined, when that the sensor had operated for the third preset number of cycles in total, that the air quality detected by the sensor is less than the preset threshold, the sensor is controlled to operate continuously for a time period of 1 minute to 2 minutes and stop operating for a time period of 18 minutes to 20 minutes to perform a periodic control for 3 cycles per hour.

In the embodiment, the current time period is obtained, and the operating mode of the sensor is determined based on the current time period. In a case that the current time period is a daytime period, the sensor is controlled to operate continuously for the first preset operating time period and stop operating for the first preset power-down time period to perform a periodic control for the first preset number of cycles per hour. In a case that the current time period is a nighttime period, the sensor is controlled to operate continuously for the second preset operating time period and stop operating for the second preset power-down time period to perform a periodic control for the second preset number of cycles per hour. Based on the present disclosure, the technical problem that operating life time of a sensor is shortened when air quality is detected by the sensor in a real-time manner at present due to the fact that the sensor is required to be in an operating state whether the air quality changes or not is solved. In addition, in a case that it is determined, after the sensor has operated for a time period, that the air quality is less than the preset threshold, a processing for extending power-down time is performed, thereby further extending the operating life of the sensor.

Figure 3:
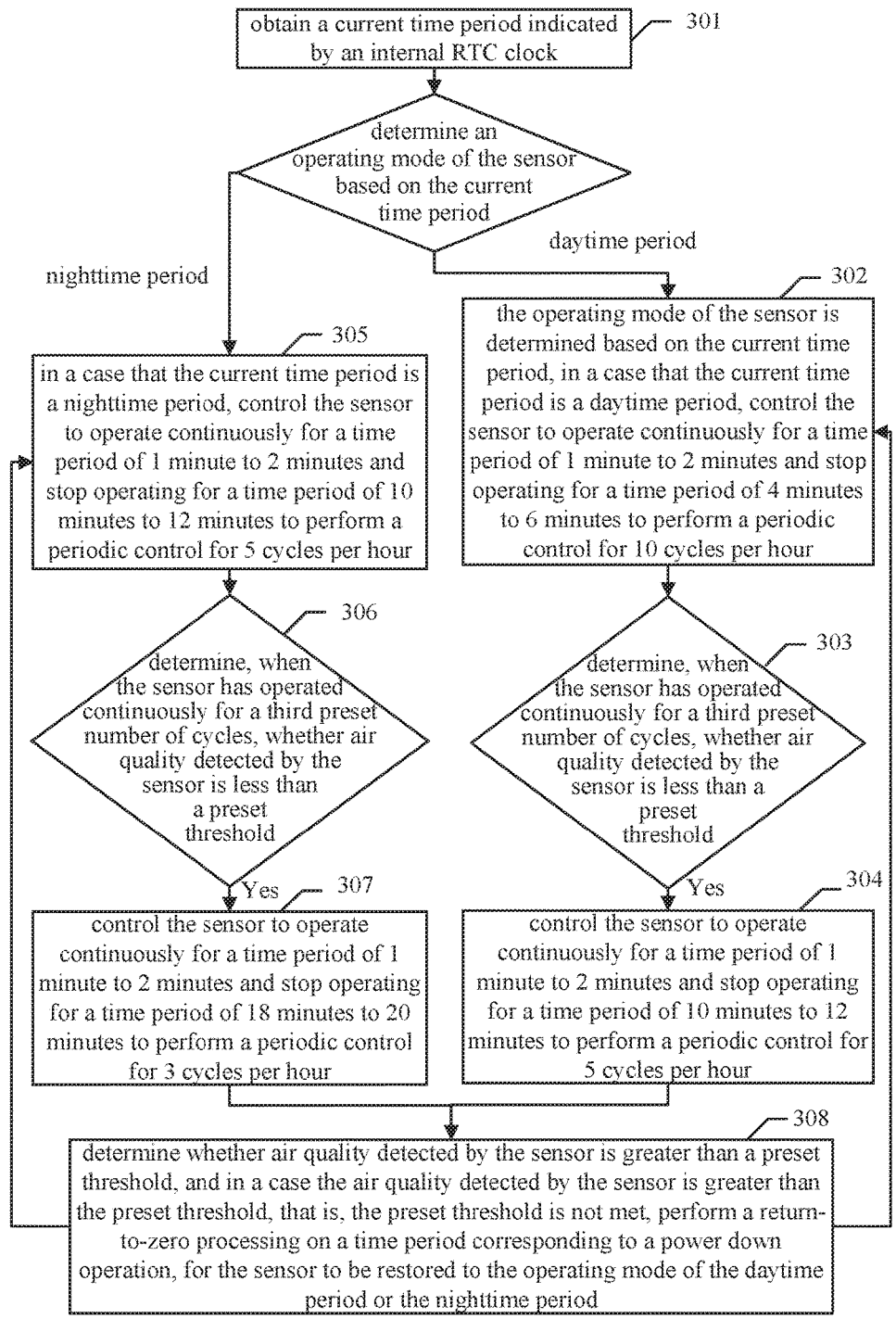
FIG. 3 is a schematic flow chart of a method for controlling operation of a sensor in an air purifier according to another embodiment of the present disclosure.

The specific process is described above in detail, and hereinafter, an additional process is described in detail. Referring to FIG. 3, a method for controlling operation of a sensor in an air purifier according to another embodiment of the present disclosure includes the following steps 301 to 308.

In step 301, a current time period indicated by an internal RTC clock is obtained.

In the embodiment, in order to make a sensor in an air purifier operate in an intermittent mode, the current time period indicated by the internal RTC clock needs to be obtained.

In step 302, an operating mode of the sensor is determined based on the current time period. In a case that the current time period is a daytime period, the sensor is controlled to operate continuously for a time period of 1 minute to 2 minutes and stop operating for a time period of 4 minutes to 6 minutes to perform a periodic control for 10 cycles per hour.

After the current time period indicated by the internal RTC clock is obtained, the operating mode of the sensor needs to be determined based on the current time period. In a case that the current time period is a daytime period, the sensor is controlled to operate continuously for a time period of 1 minute to 2 minutes and stop operating for a time period of 4 minutes to 6 minutes to perform a periodic control for 10 cycles per hour.

In step 303, it is determined, when the sensor has operated continuously for a third preset number of cycles, whether air quality detected by the sensor is less than a preset threshold. If the air quality is less than the preset threshold, the process proceeds to step 304.

In a case that the current time period is a daytime period, the sensor is controlled to operate continuously for a time period of 1 minute to 2 minutes and stop operating for a time period of 4 minutes to 6 minutes to perform a periodic control for 10 cycles per hour. Then, it needs to be determined, when the sensor has operated continuously for the third preset number of cycles, whether the air quality detected by the sensor is less than the preset threshold. If the air quality is less than the preset threshold, the process proceeds to step 304.

In step 304, the sensor is controlled to operate continuously for a time period of 1 minute to 2 minutes and stop operating for a time period of 10 minutes to 12 minutes to perform a periodic control for 5 cycles per hour.

If it is determined, when the sensor has operated continuously for the third preset number of cycles, that the air quality detected by the sensor is less than the preset threshold, the sensor is controlled to operate continuously for a time period of 1 minute to 2 minutes and stop operating for a time period of 10 minutes to 12 minutes to perform a periodic control for 5 cycles per hour.

In step 305, in a case that the current time period is a nighttime period, the sensor is controlled to operate continuously for a time period of 1 minute to 2 minutes and stop operating for a time period of 10 minutes to 12 minutes to perform a periodic control for 5 cycles per hour.

The operating mode of the sensor is determined based on the current time period. In a case that the current time period is a nighttime period, the sensor is controlled to operate continuously for a time period of 1 minute to 2 minutes and stop operating for a time period of 10 minutes to 12 minutes to perform a periodic control for 5 cycles per hour.

In step 306, it is determined, when the sensor has operated continuously for a third preset number of cycles, whether air quality detected by the sensor is less than a preset threshold. If the air quality is less than the preset threshold, the process proceeds to step 307.

In a case that the current time period is a nighttime period, the sensor is controlled to operate continuously for a time period of 1 minute to 2 minutes and stop operating for a time period of 10 minutes to 12 minutes to perform a periodic control for 5 cycles per hour. Then, it needs to be determined, when the sensor has operated continuously for the third preset number of cycles, whether the air quality detected by the sensor is less than the preset threshold. If the air quality is less than the preset threshold, the process proceeds to step 207.

In step 307, the sensor is controlled to operate continuously for a time period of 1 minute to 2 minutes and stop operating for a time period of 18 minutes to 20 minutes to perform a periodic control for 3 cycles per hour.

If it is determined, when the sensor has operated continuously for the third preset number of cycles, that the air quality detected by the sensor is less than the preset threshold, the sensor is controlled to operate continuously for a time period of 1 minute to 2 minutes and stop operating for a time period of 18 minutes to 20 minutes to perform a periodic control for 3 cycles per hour.

In step 308, it is determined whether air quality detected by the sensor is greater than a preset threshold. If the air quality is greater than the preset threshold, a return-to-zero processing on a time period corresponding to a power down operation is performed, for the sensor to be restored to the operating mode of the daytime period or the nighttime period.

After step 304 or step 308, it needs to be determined whether the air quality detected by the sensor is greater than the preset threshold. If the air quality is greater than the preset threshold, the return-to-zero processing is performed on the time period corresponding to the power down operation, for the sensor to be restored to the operating mode of the daytime period or the nighttime period. Then, the process returns to step 302 or step 305.

In the embodiment, the current time period is obtained, and the operating mode of the sensor is determined based on the current time period. In a case that the current time period is a daytime period, the sensor is controlled to operate continuously for the first preset operating time period and stop operating for the first preset power-down time period to perform a periodic control for the first preset number of cycles per hour. In a case that the current time period is a nighttime period, the sensor is controlled to operate continuously for the second preset operating time period and stop operating for the second preset power-down time period to perform a periodic control for the second preset number of cycles per hour. Based on the present disclosure, the technical problem that operating life time of a sensor is shortened when air quality is detected by the sensor in a real-time manner at present due to the fact that the sensor is required to be in an operating state whether the air quality changes or not is solved. In addition, in a case that it is determined, after the sensor has operated for a time period, that the air quality is less than the preset threshold, a processing for extending power-down time is performed, thereby further extending the operating life of the sensor.

Furthermore, in a case that it is determined that the air quality detected by the sensor does not meet the preset threshold, the return-to-zero processing is performed on the time period corresponding to the power down operation, for the sensor to be restored to the operating mode of the daytime period or the nighttime period, thereby achieving a more intelligent control.

Figure 4:
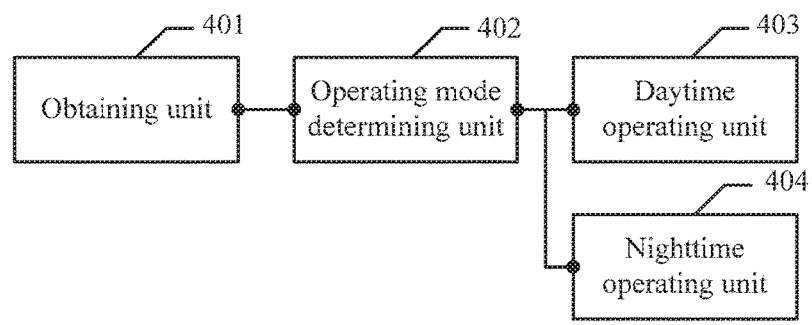
FIG. 4 is a schematic structural diagram of a device for controlling operation of a sensor in an air purifier according to an embodiment of the present disclosure.

Referring to FIG. 4, a device for controlling operation of a sensor in an air purifier according to an embodiment of the present disclosure includes an obtaining unit 401, an operating mode determining unit 402, a daytime operating unit 403 and nighttime operating unit 404.

The obtaining unit 401 is configured to obtain a current time period.

The operating mode determining unit 402 is configured to determine an operating mode of the sensor based on the current time period, trigger the daytime operating unit 403 in a case that the current time period is a daytime period, and trigger the nighttime operating unit 404 in a case that the current time period is a nighttime period.

The daytime operating unit 403 is configured to control the sensor to operate continuously for a first preset operating time period and stop operating for a first preset power-down time period to perform a periodic control for a first preset number of cycles per hour.

The nighttime operating unit 404 is configured to control the sensor to operate continuously for a second preset operating time period and stop operating for a second preset power-down time period to perform a periodic control for a second preset number of cycles per hour.

In the embodiment, the current time period is obtained by the obtaining unit 401, and the operating mode of the sensor is determined by the operating mode determining unit 402 based on the current time period. In a case that the current time period is a daytime period, the daytime operating unit 403 controls the sensor to operate continuously for the first preset operating time period and stop operating for the first preset power-down time period to perform a periodic control for the first preset number of cycles per hour. In a case that the current time period is a nighttime period, the nighttime operating unit 404 controls the sensor to operate continuously for the second preset operating time period and stop operating for the second preset power-down time period to perform a periodic control for the second preset number of cycles per hour. Based on the present disclosure, the technical problem that operating life time of a sensor is shortened when air quality is detected by the sensor in a real-time manner at present due to the fact that the sensor is required to be in an operating state whether the air quality changes or not is solved.

Figure 5:
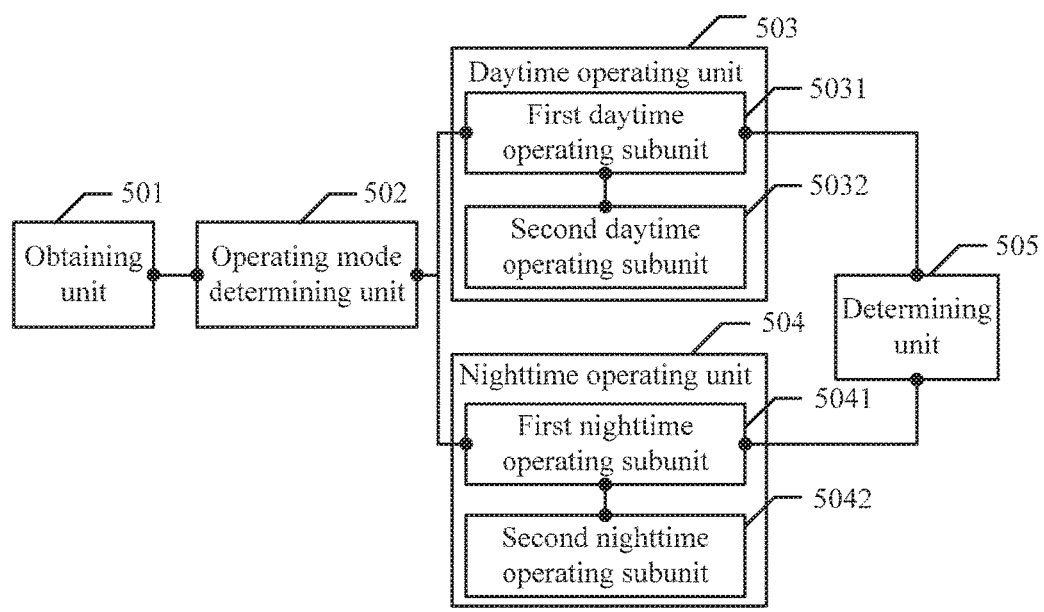
FIG. 5 is a schematic structural diagram of a method for controlling operation of a sensor in an air purifier according to another embodiment of the present disclosure.

The various units of the device for controlling the operation of the sensor in the air purifier is described above in detail, and hereinafter, additional units are described in detail. Referring to FIG. 5, a device for controlling operation of a sensor in an air purifier according to another embodiment of the present disclosure includes: an obtaining unit 501, an operating mode determining unit 502, a daytime operating unit 503, a nighttime operating unit 504 and a determining unit 505.

The obtaining unit 501 is configured to obtain a current time period, and is specifically configured to obtain the current time period indicated by an internal RTC clock.

The operating mode determining unit 502 is configured to determine an operating mode of the sensor based on the current time period, trigger the daytime operating unit 503 in a case that the current time period is a daytime period, and trigger the nighttime operating unit 504 in a case that the current time period is a nighttime period.

The daytime operating unit 503 is configured to control the sensor to operate continuously for a first preset operating time period and stop operating for a first preset power-down time period to perform a periodic control for a first preset number of cycles per hour.

The daytime operating unit 503 specifically includes:

a first daytime operating subunit 5031, configured to control, in a case that the current time period is a daytime period, the sensor to operate continuously for a time period of 1 minute to 2 minutes and stop operating for a time period of 4 minutes to 6 minutes to perform a periodic control for 10 cycles per hour; and a second daytime operating subunit 5032, configured to determine, when the sensor has operated continuously for a third preset number of cycles, whether air quality detected by the sensor is less than a preset threshold, and control, in a case the air quality detected by the sensor is less than the preset threshold, the sensor to operate continuously for a time period of 1 minute to 2 minutes and stop operating for a time period of 10 minutes to 12 minutes to perform a periodic control for 5 cycles per hour.

The nighttime operating unit 504 is configured to control the sensor to operate continuously for a second preset operating time period and stop operating for a second preset power-down time period to perform a periodic control for a second preset number of cycles per hour.

The nighttime operating unit 504 specifically includes:

a first nighttime operating subunit 5041, configured to control, in a case that the current time period is a daytime period, the sensor to operate continuously for a time period of 1 minute to 2 minutes and stop operating for a time period of 10 minutes to 12 minutes to perform a periodic control for 5 cycles per hour; and a second nighttime operating subunit 5042, configured to determine, when the sensor has operated continuously for a third preset number of cycles, whether air quality detected by the sensor is less than a preset threshold, and control, in a case the air quality detected by the sensor is less than the preset threshold, the sensor to operate continuously for a time period of 1 minute to 2 minutes and stop operating for a time period of 18 minutes to 20 minutes to perform a periodic control for 3 cycles per hour.

The determining unit 505 is configured to determine whether air quality detected by the sensor is greater than a preset threshold. In a case the air quality detected by the sensor is greater than the preset threshold, a return-to-zero processing is performed on a time period corresponding to a power down operation, and the first daytime operating subunit 5031 or the first nighttime operating subunit 5041 is triggered, for the sensor to be restored to the operating mode of the daytime period or the nighttime period.

In the embodiment, the current time period is obtained by the obtaining unit 501, and the operating mode of the sensor is determined by the operating mode determining unit 502 based on the current time period. In a case that the current time period is a daytime period, the daytime operating unit 503 controls the sensor to operate continuously for the first preset operating time period and stop operating for the first preset power-down time period to perform a periodic control for the first preset number of cycles per hour. In a case that the current time period is a nighttime period, the nighttime operating unit 504 controls the sensor to operate continuously for the second preset operating time period and stop operating for the second preset power-down time period to perform a periodic control for the second preset number of cycles per hour. Based on the present disclosure, the technical problem that operating life time of a sensor is shortened when air quality is detected by the sensor in a real-time manner at present due to the fact that the sensor is required to be in an operating state whether the air quality changes or not is solved. In addition, in a case that it is determined, after the sensor has operated for a time period, that the air quality is less than the preset threshold, a processing for extending power-down time is performed, thereby further extending the operating life of the sensor. Furthermore, in a case that it is determined that the air quality detected by the sensor does not meet the preset threshold, the return-to-zero processing is performed on the time period corresponding to the power down operation, for the sensor to be restored to the operating mode of the daytime period or the nighttime period, thereby achieving a more intelligent control.

It can be clearly understood by those skilled in the art that, for specific operation processes of the system, device and unit described above, reference can be made to corresponding processes in the method embodiments described above, which are not described herein for simplicity.

It should be understood that the disclosed system, device and method according to the embodiments of the present disclosure may be implemented in other ways. For example, the device embodiments described above are illustrative only. For example, the units are divided merely in logical function, which may be divided in another way in actual implementation. For example, multiple units or components may be combined or integrated into another system, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separated components may or may not be physically separated. A component displayed as a unit may or may not be a physical unit, which may be located in one position or distributed on multiple network units. A part or all of the units may be selected to achieve the object of solutions in the embodiments based on actual needs.

In addition, the functional units in the embodiments of the present disclosure may be integrated into a process unit or physically separated, or two or more units may be integrated into a unit. The integrated unit described above may be implemented in hardware or in software functional unit.

If the integrated unit is implemented in a form of a software functional unit and is sold or used as a separate product, it may be stored in a computer readable storage medium. With this in mind, the essence of the technical solutions, some of the technical solutions which contribute to the conventional technology, or, all or part of the technical solutions of the present disclosure may be implemented in a form of a software product, and the computer software product is stored in a storage medium and includes several instructions for enabling a computer device (which may be a personal computer, a server or a network device, etc.) to execute all or some of the steps in the method according to the embodiments of the present disclosure. The storage medium includes a medium capable of storing program codes, such as a USB flash disk, a mobile hard disk, a read-only memory (ROM, Read-Only Memory), a random access memory (RAM, Random Access Memory), a disk or a compact disc.

As described above, the embodiments are only used to illustrate the technical solutions in the present disclosure, and the present disclosure is not limited hereto. Although the present disclosure is illustrated in detail with reference to the embodiments, those skilled in the art should understand that modifications to the technical solutions in the embodiments can be made, or equivalent substitutions to some of the technical features can be made, and the modifications or substitutions do not make the essence of corresponding technical solutions depart from the spirit and scope of the technical solutions in the embodiments of the present disclosure.

The invention claimed is:

1. A method for controlling operation of a sensor in an air purifier, comprising:
   obtaining a current time period;
   determining an operating mode of the sensor based on the current time period, and controlling, in a case that the current time period is a daytime period, the sensor to operate continuously for a first preset operating time period and stop operating for a first preset power-down time period to perform a periodic control for a first preset number of cycles per hour; and
   controlling, in a case that the current time period is a nighttime period, the sensor to operate continuously for a second preset operating time period and stop operating for a second preset power-down time period to perform a periodic control for a second preset number of cycles per hour.

2. The method for controlling the operation of the sensor in the air purifier according to claim 1, wherein the obtaining a current time period specifically comprises: obtaining the current time period indicated by an internal RTC clock.

3. The method for controlling the operation of the sensor in the air purifier according to claim 1, wherein the controlling, in a case that the current time period is a daytime period, the sensor to operate continuously for a first preset operating time period and stop operating for a first preset power-down time period to perform a periodic control for a first preset number of cycles per hour specifically comprises:
   controlling, in a case that the current time period is a daytime period, the sensor to operate continuously for a time period of 1 minute to 2 minutes and stop operating for a time period of 4 minutes to 6 minutes to perform a periodic control for 10 cycles per hour.

4. The method for controlling the operation of the sensor in the air purifier according to claim 1, wherein the controlling, in a case that the current time period is a nighttime period, the sensor to operate continuously for a second preset operating time period and stop operating for a second preset power-down time period to perform a periodic control for a second preset number of cycles per hour specifically comprises:
   controlling, in a case that the current time period is a nighttime period, the sensor to operate continuously for a time period of 1 minute to 2 minutes and stop operating for a time period of 10 minutes to 12 minutes to perform a periodic control for 5 cycles per hour.

5. The method for controlling the operation of the sensor in the air purifier according to claim 3, wherein after the controlling, in a case that the current time period is a daytime period, the sensor to operate continuously for a time period of 1 minute to 2 minutes and stop operating for a time period of 4 minutes to 6 minutes to perform a periodic control for 10 cycles per hour, the method further comprises:
   determining, when the sensor has operated continuously for a third preset number of cycles, whether air quality detected by the sensor is less than a preset threshold, and controlling, in a case the air quality detected by the sensor is less than the preset threshold, the sensor to operate continuously for a time period of 1 minute to 2 minutes and stop operating for a time period of 10 minutes to 12 minutes to perform a periodic control for 5 cycles per hour.

6. The method for controlling the operation of the sensor in the air purifier according to claim 4, wherein after the controlling, in a case that the current time period is a nighttime period, the sensor to operate continuously for a time period of 1 minute to 2 minutes and stop operating for a time period of 10 minutes to 12 minutes to perform a periodic control for 5 cycles per hour, the method further comprises:
   determining, when the sensor has operated continuously for a third preset number of cycles, whether air quality detected by the sensor is less than a preset threshold, and controlling, in a case the air quality detected by the sensor is less than the preset threshold, the sensor to operate continuously for a time period of 1 minute to 2 minutes and stop operating for a time period of 18 minutes to 20 minutes to perform a periodic control for 3 cycles per hour.

7. The method for controlling the operation of the sensor in the air purifier according to claim 5, wherein after the determining, when the sensor has operated continuously for a third preset number of cycles, whether air quality detected by the sensor is less than a preset threshold, and controlling, in a case the air quality detected by the sensor is less than the preset threshold, the sensor to operate continuously for a time period of 1 minute to 2 minutes and stop operating for a time period of 10 minutes to 12 minutes to perform a periodic control for 5 cycles per hour, the method further comprises:
   determining whether air quality detected by the sensor is greater than a preset threshold, and performing, in a case the air quality detected by the sensor is greater than the preset threshold, a return-to-zero processing on a time period corresponding to a power down operation, for the sensor to be restored to the operating mode of the daytime period or the nighttime period.

8. The method for controlling the operation of the sensor in the air purifier according to claim 6, wherein after the determining, when the sensor has operated continuously for a third preset number of cycles, whether air quality detected by the sensor is less than a preset threshold, and controlling, in a case the air quality detected by the sensor is less than the preset threshold, the sensor to operate continuously for a time period of 1 minute to 2 minutes and stop operating for a time period of 18 minutes to 20 minutes to perform a periodic control for 3 cycles per hour, the method further comprises:
   determining whether air quality detected by the sensor is greater than a preset threshold, and performing, in a case the air quality detected by the sensor is greater than the preset threshold, a return-to-zero processing on a time period corresponding to a power down operation, for the sensor to be restored to the operating mode of the daytime period or the nighttime period.

9. A device for controlling operation of a sensor in an air purifier, comprising:
   an obtaining unit, configured to obtain a current time period;
   an operating mode determining unit, configured to determine an operating mode of the sensor based on the current time period, trigger a daytime operating unit in a case that the current time period is a daytime period, and trigger a nighttime operating unit in a case that the current time period is a nighttime period;

the daytime operating unit, configured to control the sensor to operate continuously for a first preset operating time period and stop operating for a first preset power-down time period to perform a periodic control for a first preset number of cycles per hour; and the nighttime operating unit, configured to control the sensor to operate continuously for a second preset operating time period and stop operating for a second preset power-down time period to perform a periodic control for a second preset number of cycles per hour.

10. The device for controlling the operation of the sensor in the air purifier according to claim 9, wherein the obtaining unit is specifically configured to obtain the current time period indicated by an internal RTC clock.

11. The device for controlling the operation of the sensor in the air purifier according to claim 9, wherein the daytime operating unit specifically comprises: a first daytime operating subunit, configured to control, in a case that the current time period is a daytime period, the sensor to operate continuously for a time period of 1 minute to 2 minutes and stop operating for a time period of 4 minutes to 6 minutes to perform a periodic control for 10 cycles per hour.

12. The device for controlling the operation of the sensor in the air purifier according to claim 9, wherein the nighttime operating unit specifically comprises: a first nighttime operating subunit, configured to control, in a case that the current time period is a nighttime period, the sensor to operate continuously for a time period of 1 minute to 2 minutes and stop operating for a time period of 10 minutes to 12 minutes to perform a periodic control for 5 cycles per hour.

13. The device for controlling the operation of the sensor in the air purifier according to claim 11, wherein the daytime operating unit further comprises: a second daytime operating subunit, configured to determine, when the sensor has operated continuously for a third preset number of cycles, whether air quality detected by the sensor is less than a preset threshold, and control, in a case the air quality detected by the sensor is less than the preset threshold, the sensor to operate continuously for a time period of 1 minute to 2 minutes and stop operating for a time period of 10 minutes to 12 minutes to perform a periodic control for 5 cycles per hour.

14. The device for controlling the operation of the sensor in the air purifier according to claim 12, wherein the nighttime operating unit further comprises: a second nighttime operating subunit, configured to determine, when the sensor has operated continuously for a third preset number of cycles, whether air quality detected by the sensor is less than a preset threshold, and control, in a case the air quality detected by the sensor is less than the preset threshold, the sensor to operate continuously for a time period of 1 minute to 2 minutes and stop operating for a time period of 18 minutes to 20 minutes to perform a periodic control for 3 cycles per hour.

15. The device for controlling the operation of the sensor in the air purifier according to claim 13, further comprising: a determining unit, configured to determine whether air quality detected by the sensor is greater than a preset threshold, and perform, in a case the air quality detected by the sensor is greater than the preset threshold, a return-to-zero processing on a time period corresponding to a power down operation, for the sensor to be restored to the operating mode of the daytime period or the nighttime period.

16. The device for controlling the operation of the sensor in the air purifier according to claim 14, further comprising: a determining unit, configured to determine whether air quality detected by the sensor is greater than a preset threshold, and perform, in a case the air quality detected by the sensor is greater than the preset threshold, a return-to-zero processing on a time period corresponding to a power down operation, for the sensor to be restored to the operating mode of the daytime period or the nighttime period.

* * * * *